United States Patent [19]

Rosen

[11] 3,754,405
[45] Aug. 28, 1973

[54] METHOD OF CONTROLLING THE HYDROCARBON DEW POINT OF A GAS STREAM

[75] Inventor: Ward F. Rosen, Oklahoma City, Okla.

[73] Assignee: Black, Sivalls & Bryson, Inc., Kansas City, Mo.

[22] Filed: Feb. 10, 1969

[21] Appl. No.: 797,960

[52] U.S. Cl............................ 62/21, 62/11, 62/40, 62/50
[51] Int. Cl............................. F25j 3/00, F25j 3/06
[58] Field of Search ...................... 62/9, 11, 23, 40, 62/21, 37, 50; 208/351, 352, 368

[56] References Cited
UNITED STATES PATENTS

| | | | |
|---|---|---|---|
| 2,134,699 | 11/1938 | Brewster | 62/40 |
| 2,258,015 | 10/1941 | Keith | 62/23 |
| 2,265,558 | 12/1941 | Ward | 62/23 |
| 2,274,094 | 2/1942 | Rupp | 62/23 |
| 2,909,905 | 10/1959 | Mitchell | 62/23 |
| 3,076,318 | 2/1963 | Becker | 62/23 |
| 2,538,664 | 1/1951 | Benz | 62/50 |

Primary Examiner—Norman Yudkoff
Assistant Examiner—A. F. Purcell
Attorney—Dunlap, Laney, Hessin & Dougherty

[57] ABSTRACT

The present invention relates to a method of controlling the hydrocarbon dew point of a gas stream in order to prevent condensation of the gas stream in subsequent gas transmission and distribution systems. The gas stream is passed in heat exchange relationship with an expanded refrigerant stream thereby cooling the gas stream and liquifying only those condensible components in said gas stream required to obtain a desired residue gas dew point. The cooled residue gas is then passed in heat exchange relationship with the refrigerant stream after the refrigerant stream has been compressed thereby condensing the refrigerant stream and heating the residue gas stream well above its dew point.

6 Claims, 2 Drawing Figures

INVENTOR.
WARD F. ROSEN

METHOD OF CONTROLLING THE HYDROCARBON DEW POINT OF A GAS STREAM

BACKGROUND OF THE INVENTION

1. Field of the Invention

This invention relates generally to a method of controlling the hydrocarbon dew point of a gas stream and more particularly, but not by way of limitation, to a method of controlling the hydrocarbon dew point of a gas stream wherein condensible components in said gas stream are liquified to produce a residue gas stream having a desired hydrocarbon dew point.

2. Description of the Prior Art

Natural gas produced from oil and gas wells normally comprises a mixture of hydrocarbon components having varying boiling points. That is, a gas stream produced from a well contains a mixture of hydrocarbon components which exist in the vapor phase at the particular pressure and temperature levels at which the well is produced. If the gas stream pressure is changed or the temperature is decreased, or both, some of the hydrocarbon components contained in the gas stream are liquified or condensed. The temperature at which some of the components of a gas stream comprised of hydrocarbons will condense at a particular pressure level is known as the hydrocarbon dew point of the gas stream.

In the natural gas industry, a number of oil and gas wells are commonly produced with the gas streams from all the wells passing into a common pipeline for transmission and distribution at a point remote from the oil field. As the gas passes through the transmission pipeline, the pressure of the gas drops due to friction, and particularly during the winter months, the temperature of the gas is lowered due to atmospheric conditions. Thus, condensible components contained within the gas stream passing through the pipeline are condensed. The condensation of such components in a gas transmission system is detrimental in that the flow of gas through the system is impaired, and, if not removed prior to distribution of the gas to domestic users, explosions and fires may result.

Many various methods and apparatus have been developed for removing condensible components from gas streams prior to the gas entering the transmission pipe line. Some examples of these methods are adsorption of condensible components from gas streams on beds of dry desiccant such as activated carbon, silica gel, etc., adsorption of condensible components by a liquid desiccant such as naphtha or kerosene, and condensation of condensible components through expansion of the gas stream. These methods commonly involve converting a high percentage of the components in the gas stream to the liquid phase and separating them from the gas stream leaving a residue gas containing only those components having low boiling points. This is often undesirable in that the components having high boiling points when left in the gas add to the heating value of the gas. Additionally, the apparatus required to carry out these prior methods are expensive to install and operate.

The present invention provides a method of removing only those components from a gas stream which will condense at the conditions to be encountered within the transmission or distribution system thereby allowing a gas stream to be delivered to the point of use having a heating value as high as possible.

SUMMARY OF THE INVENTION

The present invention relates to a method of controlling the hydrocarbon dew point of a gas stream comprising cooling the gas stream with an expanded refrigerant stream so that condensible components in said gas stream are liquified and a residue gas having a desired hydrocarbon dew point remains. The residue gas is separated from the liquified condensible components, and the expanded refrigerant stream is compressed. The residue gas stream is then heated with the compressed refrigerant stream to a temperature level above the dew point of said residue gas stream, and the residue gas stream is conducted to a distribution system.

It is therefore a general object of the present invention to provide a method of controlling the hydrocarbon dew point of a gas stream.

A further object of the present invention is the provision of a method of controlling the hydrocarbon dew point of a gas stream wherein only those components which will condense at conditions to be encountered within the transmission or distribution system are removed thereby maintaining the heating value of the residue gas as high as possible.

Yet a further object of the present invention is the provision of a method of controlling the hydrocarbon dew point of a gas stream which is relatively inexpensive to carry out.

Other objects and advantages of the invention will be evident from the following detailed description when read in conjunction with the accompanying drawings which illustrate the invention.

DESCRIPTION OF THE PREFERRED EMBODIMENT

Figure 1:
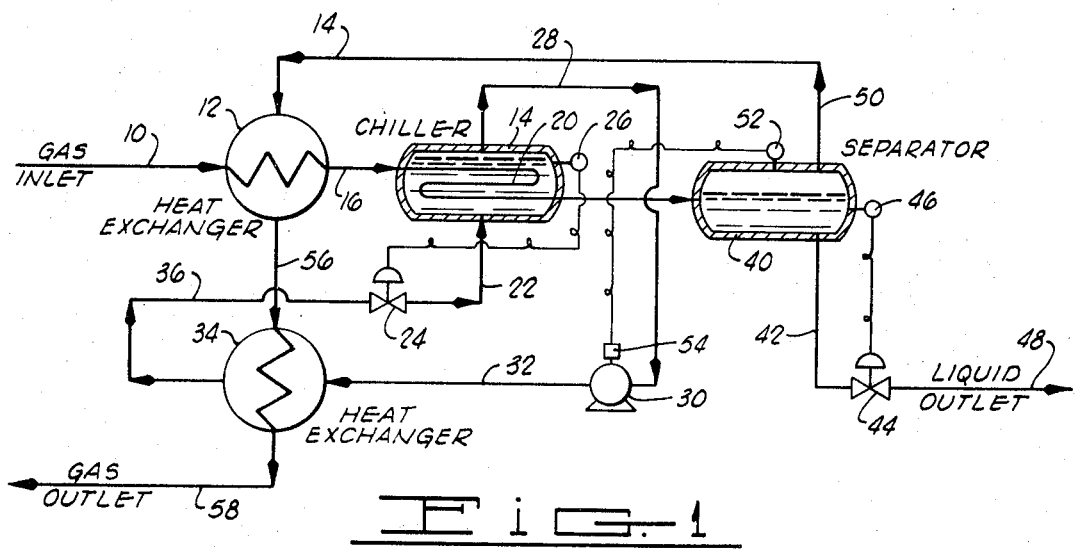
FIG. 1 illustrates, in diagrammatic form, apparatus for carrying out the method of the present invention.

Referring to the drawings, and particularly to FIG. 1, conduit 10 leads an inlet gas stream to heat exchanger 12 wherein the gas stream is cooled by exchange of heat with cool residue gas entering heat exchanger 12 through conduit 14. Heat exchanger 12 may be any conventional commercially available heat exchanger formed of materials of sufficient strength to withstand the pressure and temperature levels of the gas streams passing therethrough. A shell and tube type of heat exchanger is preferred, with the inlet gas stream passing through the tubes (the tube side) and the cool gas stream passing through the exchanger on the outside of the tubes (the shell side).

The inlet gas stream which has thus been pre-cooled in heat exchanger 12 is conducted through conduit 16 to chiller 18 wherein additional heat is removed. Chiller 18 includes a conventional coil 20 through which the gas stream passes while it is being cooled. A stream of refrigerant enters chiller 18 through conduit 22 after being expanded across valve 24. Any commercially available refrigerant such as Freon or Propane may be used in the present invention. The refrigerant is cooled through expansion across valve 24 and upon entering chiller 18 exchanges heat with the well stream passing through coil 20. A level controller 26 which may be any conventional pneumatic or electric level control device maintains a level of liquid refrigerant in chiller 18 above coil 20 by opening or closing expansion valve 24. Expansion valve 24 may be any pneumatic or electric control valve which will respond to the output signal of level controller 26.

As a result of the expansion through valve 24 and the heat absorbed by the refrigerant in chiller 18 from the well stream within coil 20, the refrigerant is vaporized and passes out of chiller 18 through conduit 28. From conduit 28 the refrigerant vapors enter the suction side of a conventional refrigerant compressor 30 wherein they are compressed. The compressed vapors are conducted from compressor 30 through conduit 32 to a heat exchanger 34 wherein heat is removed from the refrigerant vapors causing them to condense. The condensed refrigerant then passes through conduit 36 back to expansion valve 24. Thus, a conventional closed refrigeration circuit is provided whereby the refrigerant is vaporized in chiller 18 removing heat from the well stream passing therethrough, compressed by compressor 30, condensed in heat exchanger 34 and expanded by expansion valve 24.

From chiller 18, the gas stream passes through conduit 38 into separator 40. While the well stream passes through heat exchanger 12 and chiller 18 wherein it is cooled, components contained in the gas stream are condensed. By controlling the temperature of the well stream as it passes through chiller 18, as will be further discussed, only those components required to obtain a desired residue gas hydrocarbon dew point are condensed. The residue gas and condensed components enter separator 40 wherein the condensed components are separated from the residue gas and removed. Separator 40 may be any conventional liquid-gas separator which will bring about the separation of the condensed liquid from the residue gas. The condensed liquid accumulates in the bottom portion of separator 40 from where it enters conduit 42 and passes through liquid level control valve 44. A level controller 46, which may be any conventional pneumatic or electric level controller senses the level of liquid in separator 40 and opens and closes valve 44 accordingly. Valve 44 may be any conventional automatic control valve which will open and close in response to the signal received from level controller 46. From control valve 44 the condensed components are passed into conduit 48 from where they may be conducted to a storage tank or point of further processing.

A temperature controller 52, which may be any conventional pneumatic or electric temperature controller is provided on separator 40 to sense the temperature of the residue gas passing through separator 40. The output signal from temperature controller 52 operates an automatic unloading device 54 which is connected to refrigerant compressor 30. Unloading device 54 stops and starts, or otherwise loads or unloads compressor 30 in response to a signal from temperature controller 52. Such loading devices are commonly provided with refrigerant compressors which are commercially available. Thus, temperature controller 52 automatically loads compressor 30 thereby circulating more refrigerant through chiller 18 if the residue gas in separator 40 becomes too warm, and will automatically unloads compressor 30 thereby reducing the flow of refrigerant through chiller 18 if the residue gas in separator 40 becomes too cold.

The residue gas separated from the condensed components in separator 40 passes upwardly in separator 40 into conduit 50. From conduit 50 the residue gas is conducted to conduit 14 from where it enters the shell side of heat exchanger 12 previously described. Heat is exchanged with the inlet gas stream passing through the tube side of heat exchanger 12 thereby cooling the inlet gas stream and heating the residue gas stream. The thus heated residue gas stream passes out of heat exchanger 12 through conduit 56 from where it enters heat exchanger 34. Heat exchanger 34 may be any conventional heat exchanger formed of materials which will withstand the pressure and temperatures to be encountered. A shell and tube type of heat exchanger is preferred. The residue gas entering heat exchanger 34 passes through the tube side of heat exchangers 34 and exchanges heat with compressed refrigerant vapors passing through the shellside of heat exchanger 34. The heat transferred from the refrigerant vapors into the residue gas heats the residue gas and condenses the refrigerant vapors. The thus heated residue gas is conducted from heat exchanger 34 through conduit 58 to a gas transmission or distribution system.

OPERATION

In operation, the apparatus for carrying out the method of the present invention is connected to a natural gas stream which is to be transmitted through a pipe line or transmission system to a point of distribution. The gas stream is cooled to a desired temperature, the determination of which will be discussed further below, by setting temperature controller 52 to control the residue gas passing through separator 40 at that temperature. The inlet gas stream passes through heat exchanger 12 wherein it is pre-cooled and then enters chiller 18 where it is cooled to the desired temperature. When compressor 30 is loaded, it causes refrigerant to circulate within the closed refrigerant system. That is, condensed refrigerant enters expansion valve 24 from conduit 36 whereupon the pressure level of the refrigerant is reduced causing some vaporization of the refrigerant thereby cooling it. Heat transferred from the well stream passing through coil 20 disposed within chiller 18 causes further vaporization of the refrigerant. The vaporized refrigerant accumulates in the top portion of cooler 18 from where it passes into conduit 28. From conduit 28 the refrigerant vapors pass into compressor 30 wherein the vapors are compressed to a relatively high pressure and pass through conduit 32 to heat exchanger 34. Upon passing through heat exchanger 34, the refrigerant is substantially all condensed into a liquid. The liquid then passes into conduit 36 from where it is recycled through expansion valve 24, etc.

Heat exchanger 34 accomplishes two important functions. First, it brings about the condensation of the refrigerant vapors in the manner described above, and second, along with heat exchanger 12, it brings about heating of the residue gas to a temperature well above the hydrocarbon dew point of the residue gas. The heated residue gas may then be conducted to a transmission or distribution system without fear of condensation occurring.

DESIGN

A typical natural gas stream produced from oil and gas wells is shown in Table I.

TABLE I. TYPICAL ANALYSIS OF A NATURAL GAS STREAM PRODUCED FROM OIL AND GAS WELLS

| Component | Composition MOL % |
|---|---|
| Nitrogen | 1.10 |
| Carbon Dioxide | 0.50 |
| Methane | 94.37 |
| Ethane | 3.10 |
| Propane | 0.50 |
| iso-Butane | 0.10 |
| n-Butane | 0.10 |
| iso-Pentane | 0.04 |
| n-Pentane | 0.04 |
| Hexanes | 0.09 |
| Heptanes | 0.03 |
| Octanes | 0.03 |
| Total | 100.00 |

Let it be assumed that a natural gas stream having the composition shown above is to enter a transmission pipe line at a pressure of 1,000 pounds per square inch absolute. Additionally, let it be assumed that the pressure in the transmission pipe line will vary from a pressure of 1,000 pounds per square inch absolute at the forward end thereof to a pressure of 15 pounds per square inch absolute at the termination point or final gas distribution point. Also, let it be assumed that the temperature of the gas stream while it travels through the pipe line can get as low as 8°F. due to atmospheric conditions. In order to prevent condensation in the transmission and distribution system, all components contained in the gas stream which will condense within the pressure range of 15 to 1,000 pounds per square inch absolute and a temperature of 8°F. must be removed.

Figure 2:
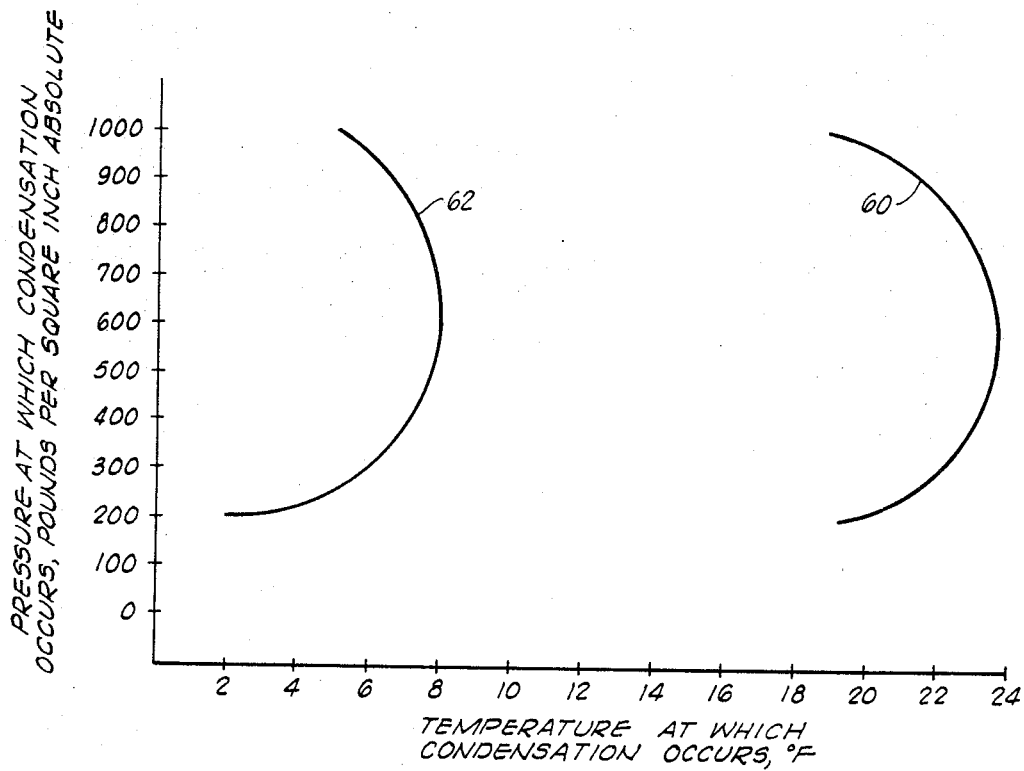
FIG. 2 is a graph illustrating temperature and pressure conditions at which condensation occurs for typical gas streams.

Referring to FIG. 2, curve 60 represents the hydrocarbon dew point of the gas stream having the composition given in Table I over the pressure range of from 15 to 1,000 pounds per square inch absolute. As will be understood by those skilled in the art, the hydrocarbon dew point of the gas stream may be calculated at any particular pressure and temperature using known engineering techniques and curve 60 prepared accordingly. As can be seen from curve 60 of FIG. 2, the hydrocarbon dew point of the gas stream will be well above 8° throughout substantially the entire pressure range expected and condensation would occur in the pipe line. Thus, it is necessary to remove condensible components from the gas stream before it enters the pipe line in order to lower the hydrocarbon dew point of the residue gas below 8°F.

In order to determine the temperature to which the inlet gas stream must be cooled to remove only those components required to reduce the hydrocarbon dew point of the residue gas to 8°F. over the pressure range expected, an operating temperature is assumed and the dew points of the residue gas calculated over the pressure range expected. Referring again to FIG. 2, curve 62 represents the hydrocarbon dew points of the residue gas remaining if the inlet gas stream is cooled to 5°F. As can be seen from the curve the maximum dew point of 8°F. will occur at a pressure of 600 pounds per square inch absolute. Thus, by cooling the gas stream having a composition as given in Table I to a temperature of 5°F. at a pressure of 1,000 pounds per square inch absolute, the residue gas remaining will not condense over the range of pressures and temperatures expected in the pipe line.

After the operating temperature is determined as described above, the apparatus for carrying out the method of the present invention may be designed in accordance with standard engineering practices to cool the gas stream to that temperature in the most economical manner. That is, a comparison of various sizes of chillers 18, related refrigeration equipment and heat exchangers 12 may be made to arrive at the most economical combination of these apparatus. As will be understood by those skilled in the art, the heat exchange surface area of heat exchangers 12 and 34 and coil 12, and the sizes of chiller 18, separator 40, and other equipment may be determined by applying conventional engineering techniques taking into consideration the volume of gas to be processed and the gas composition, pressure, temperature, etc.

Thus, the present invention provides a method of economically removing only those components within a gas stream required to produce a residue gas having a hydrocarbon dew point which will not condense within a particular transmission and distribution system.

The present invention therefore is well adapted to carry out the objects and attain the ends and advantages mentioned as well as those inherent therein. While presently preferred embodiments of the invention are given for the purpose of disclosure, numerous changes can be made which will readily suggest themselves to those skilled in the art and which are encompassed within the spirit of the invention disclosed herein.

What is claimed is:

1. A method of controlling the hydrocarbon dew point of a gas stream to be transported ine a pipeline system so that components of said gas stream are not condensed in said pipeline system comprising the steps of:

cooling said gas stream with an expanded refrigerant stream to a temperature such that only those components which will condense in said pipeline systems are liquefied and a residue gas stream having a high heating value remains;

separating said residue gas stream from said liquefied condensible components;

compressing said expanded refrigerant stream in accordance with temperature changes in said residue gas stream so that the temperature of the residue gas stream is controlled at the desired level;

exchanging heat between said residue gas stream and said compressed refrigerant stream to condense said refrigerant stream and to heat said residue gas stream to a temperature level above the hydrocarbon dew point of said residue gas stream; and conducting said residue gas stream to said pipeline system.

2. The method of claim 1 which is further characterized to include the step of cooling said gas stream with said residue gas stream prior to cooling said gas stream with said expanded refrigerant stream.

3. The method of claim 1 wherein said refrigerant stream is confined within a closed refrigeration cycle.

4. A method of controlling the hydrocarbon dew point of a gas stream to be transported in a pipeline system so that components of said gas stream are not condensed in said pipeline system comprising the steps of:

passing said gas stream in heat exchange relationship with an expanded refrigerant stream thereby vaporizing said refrigerant stream and cooling said gas stream to a temperature such that only those components contained therein which will condense in said pipeline are liquefied and a residue gas stream having a high heating value remains;

separating said residue gas stream from said liquefied components;

compressing said expanded and vaporized refrigerant stream in accordance with temperature changes in said residue gas stream so that the temperature of the residue gas stream is controlled at the desired level;

passing said residue gas stream in heat exchange relationship with said compressed refrigerant stream vapor so that said residue gas stream is heated and said compressed refrigerant stream vapor is condensed; and conducting said residue gas stream to said pipeline system.

5. The method of claim 4 which is further characterized to include the step of passing said gas stream in heat exchange relationship with said residue gas stream prior to passing said gas stream in heat exchange relationship with said expanded refrigerant stream.

6. The method of claim 4 wherein said refrigerant stream is confined within a closed refrigeration cycle.

* * * * *